(12) United States Patent
Nishizawa

(10) Patent No.: US 7,428,109 B2
(45) Date of Patent: Sep. 23, 2008

(54) IMAGE PICKUP LENS SYSTEM AND IMAGE PICKUP APPARATUS

(75) Inventor: Ikuko Nishizawa, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/888,086

(22) Filed: Jul. 31, 2007

(65) Prior Publication Data

US 2008/0030875 A1 Feb. 7, 2008

(30) Foreign Application Priority Data

Aug. 2, 2006 (JP) ............................. 2006-210735

(51) Int. Cl.
*G02B 9/04* (2006.01)
*G02B 9/00* (2006.01)
*G02B 3/02* (2006.01)

(52) U.S. Cl. ...................... 359/795; 359/793; 359/738; 359/717

(58) Field of Classification Search ................. 359/708, 359/717, 738, 739, 793, 795
See application file for complete search history.

(56) References Cited

U.S. PATENT DOCUMENTS 7,180,685 B2 * 2/2007 Wang et al. .................. 359/717

FOREIGN PATENT DOCUMENTS

JP 2004-062014 A 2/2004
JP 2004-177976 A 6/2004

* cited by examiner

*Primary Examiner*—William C. Choi
*Assistant Examiner*—Jack Dinh
(74) *Attorney, Agent, or Firm*—Wolf, Greenfield & Sacks, P.C.

(57) ABSTRACT

An image pickup lens system includes, successively in order from an object side, an aperture stop, a first lens as a double-convex positive lens, and a second lens as a negative meniscus lens having a convex surface on an image side. Each of the first and second lenses has at least one aspherical surface. The image pickup lens system satisfies the following conditional formulas (1), (2), and (3):

$$0.24 < |f1/f2| < 0.68 \quad (1)$$

$$0.83 < R1/f < 3.68 \quad (2)$$

$$0.13 < D3/f < 0.31, \text{ where} \quad (3)$$

f1: the focal length of the first lens;
f2: the focal length of the second lens;
R1: the paraxial radius of curvature of the surface on the object side of the first lens;
f: the focal length of the entire system; and
D3: the axial surface-to-surface distance between the first lens and the second lens.

2 Claims, 7 Drawing Sheets

IMAGE PICKUP LENS SYSTEM AND IMAGE PICKUP APPARATUS

CROSS REFERENCES TO RELATED APPLICATIONS

The present invention contains subject matter related to Japanese Patent Application JP 2006-210735, filed in the Japan Patent Office on Aug. 2, 2006, the entire contents of which being incorporated herein by reference.

BACKGROUND OF THE INVENTION

1. Field of the Invention

The present invention relates to an image pickup lens system and an image pickup apparatus, and more particularly to an image pickup lens system suitable for use in a small-size camera such as a camera for video telephone on a cellular phone or a camera for video conference on a laptop personal computer, for example, the image pickup lens system having a wide angle of view capable of capturing images in a portrait image capturing range and also having a good focusing capability up to a peripheral image region, and an image pickup apparatus incorporating such an image pickup lens system.

2. Description of the Related Art

There have been proposed image pickup lens systems for use with an imager such as a CCD (Charge-Coupled Device) or a CMOS (Complementary Metal-Oxide Semiconductor) used in small-size cameras. The proposed image pickup lens systems employ plastic lenses rather than glass lenses and include a small number of lenses for a reduced cost and a compact size.

It has heretofore been necessary for such image pickup lens systems to be constructed as an optical system with aberrations appropriately corrected to reduce the optical length of the lenses and achieve good image quality for the purpose of reducing the size of cameras incorporating such image pickup lens systems therein.

Many image pickup lens systems employing two plastic lenses in two groups have been invented and reported as disclosed in Japanese patent laid-open Nos. 2004-62014 and 2004-177976. The image pickup lens system disclosed in the former publication includes a positive lens and a negative lens, and the image pickup lens system disclosed in the latter publication includes a positive lens and a positive lens.

In recent years, since small-size cameras have been finding a wide variety of applications including a camera for video telephone on a cellular phone and a camera for video conference on a laptop personal computer, there has been a demand for small-size cameras with a wide angle of view capable of capturing images in a portrait image capturing range.

SUMMARY OF THE INVENTION

It is desirable to provide an image pickup lens system having a wide angle of view capable of capturing images in a portrait image capturing range and also having a good focusing capability up to a peripheral image region, and an image pickup apparatus incorporating such an image pickup lens system.

According to an embodiment of the present invention, there is provided an image capturing optical system including, successively in order from an object side:

an aperture stop;

a first lens as a double-convex positive lens; and a second lens as a negative meniscus lens having a convex surface on an image side;

each of the first and second lenses having at least one aspherical surface, the image pickup lens system satisfying the following conditional formulas (1), (2), and (3):

$$0.24 < |f1/f2| < 0.68 \quad (1)$$

$$0.83 < R1/f < 3.68 \quad (2)$$

$$0.13 < D3/f < 0.31 \quad (3)$$

where f1: the focal length of the first lens;

f2: the focal length of the second lens;

R1: the paraxial radius of curvature of the surface on the object side of the first lens;

f: the focal length of the entire system; and

D3: the axial surface-to-surface distance between the first lens and the second lens.

According to another embodiment of the present invention, there is also provided an image pickup apparatus including:

an image pickup lens system; and an imager for converting an optical image formed by the image pickup lens system into an electric signal;

the image pickup lens system including, successively in order from an object side, an aperture stop, a first lens as a double-convex positive lens, and a second lens as a negative meniscus lens having a convex surface on an image side, each of the first and second lenses having at least one aspherical surface, the image pickup lens system satisfying the conditional formula (1): $0.24 < |f1/f2| < 0.68$, the conditional formula (2): $0.83 < R1/f < 3.68$, and the conditional formula (3): $0.13 < D3/f < 0.31$ where f1: the focal length of the first lens, f2: the focal length of the second lens, R1: the paraxial radius of curvature of the surface on the object side of the first lens, f: the focal length of the entire system, and D3: the axial surface-to-surface distance between the first lens and the second lens.

According to the present invention, the image pickup lens system has a wide angle of view capable of capturing images in a portrait image capturing range and also has a good focusing capability up to a peripheral image region.

The above features and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
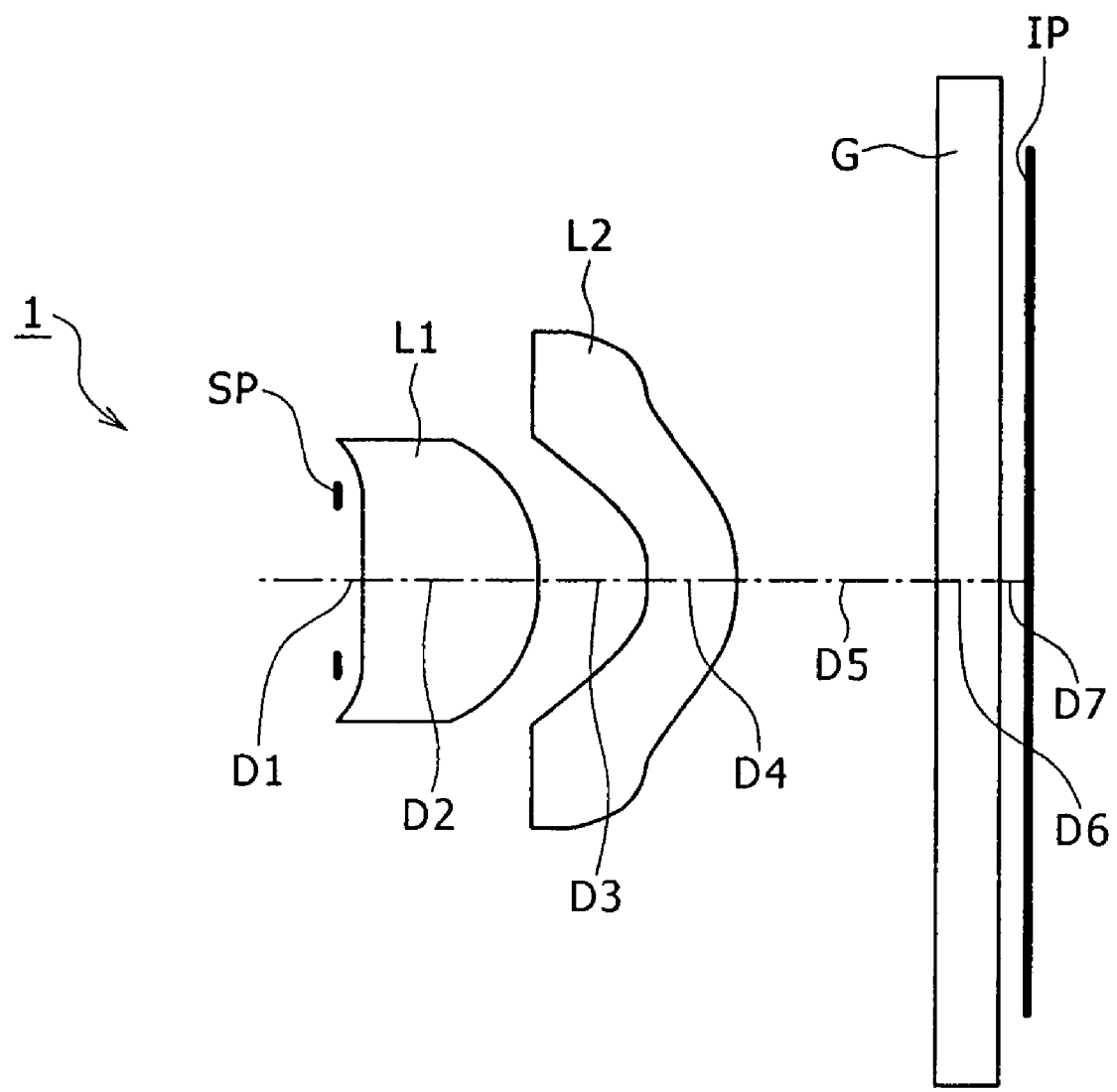
FIG. 1 is a schematic side elevational view showing a lens arrangement of an image pickup lens system according to a first embodiment of the present invention.

Image pickup lens systems and an image pickup apparatus according to preferred embodiments of the present invention will be described below with reference to the drawings.

First, an image pickup lens system according to the present invention will be described below.

The image pickup lens system includes, successively in order from an object side, an aperture stop, a first lens as a double-convex positive lens, and a second lens as a negative meniscus lens having a convex surface on an image side, each of the first and second lenses having at least one aspherical surface, the image pickup lens system satisfying the following conditional formulas (1), (2), and (3):

$$0.24 < |f1/f2| < 0.68 \quad (1)$$

$$0.83 < R1/f < 3.68 \quad (2)$$

$$0.13 < D3/f < 0.31 \quad (3)$$

where f1: the focal length of the first lens;
f2: the focal length of the second lens;
R1: the paraxial radius of curvature of the surface on the object side of the first lens;
f: the focal length of the entire system; and
D3: the axial surface-to-surface distance between the first lens and the second lens.

The image pickup lens system according to the present invention which is of the above structure has a wide angle of view capable of capturing images in a portrait image capturing range and also has a good focusing capability up to a peripheral image region.

The above conditional formula (1) serves to define a power distribution between the first lens and the second lens.

If |f1/f2| exceeds the upper limit, then the field curvature becomes over, failing to achieve the focusing capability particularly in a peripheral image region where the image height is large. The power of the first lens becomes small and the back focus becomes short, making it impossible to adjust the focus. The angle of view also becomes small.

Conversely, if |f1/f2| exceeds the lower limit, then the field curvature becomes under, failing to achieve the focusing capability particularly in the peripheral image region where the image height is large. The power of the first lens becomes large and the inward coma aberration becomes large, failing to achieve the focusing capability. Therefore, a good image cannot be produced if |f1/f2| exceeds the upper limit or the lower limit.

The conditional formula (2) serves to standardize the radius of curvature of the surface on the object side of the first lens with the focal length of the overall system.

If R1/f exceeds the upper limit, then the field curvature becomes over, failing to achieve the focusing capability particularly in the peripheral image region where the image height is large. The power of the first lens becomes small, the angle of field becomes small, and the back focus becomes short. Conversely, if R1/f exceeds the lower limit, then the field curvature becomes under, failing to achieve the focusing capability particularly in the peripheral image region where the image height is large. Since the inward coma aberration becomes large, the focusing capability cannot be achieved.

The conditional formula (3) serves to standardize the ratio of the air gap between the first lens and the second lens to the focal length of the overall system. If D3/F exceeds the upper limit, then the back focus becomes short, making it impossible to adjust the focus. Conversely, if D3/F exceeds the lower limit, then though the back focus becomes long, back focus variations due to an assembling error become large, so that an assembling problem will occur. The astigmatism increases to the extent that no astigmatic balance can be kept between a sagittal image surface and a meridional image surface, failing to achieve the focusing capability.

If both the first and second lenses include plastic lenses, then they can be constructed inexpensively and can have their aspherical surfaces formed with a nicety for designed performance.

The aperture stop may be provided by the peripheral edge of an opening that is defined in the casing of a camera, a cellular phone, or the like which incorporates the image pickup lens system according to the present invention, the image pickup lens system being exposed to the exterior through the opening. The image pickup lens system with such an aperture stop can be constructed more inexpensively.

The image pickup lens system according to the present invention may correct the focus upon movement of the object point, i.e., may perform focusing, with any of the lenses thereof, or may be of a pan-focus structure. If the image pickup lens system is used for a limited image capturing range with a camera for video telephone on a cellular phone or a camera for video conference on a laptop personal computer, for example, then the image pickup lens system designed as a pan-focus structure can be constructed inexpensively, but can still be sufficiently practical in performance.

Image pickup lens systems according to embodiments of the present invention and numerical examples based on specific numerical values applied to the embodiments will be described below.

The image pickup lens system according to the present invention employs an aspherical lens surface. In an orthogonal coordinate system whose origin is located at the vertex of the aspherical lens surface and whose X-axis is aligned with the optical axis of the image pickup lens system, the aspherical deformation ΔH(h) of the aspherical lens surface is expressed by the following equation:

$$\Delta H(h) = \frac{\frac{h^2}{r}}{1 + \sqrt{1 - (1+k)\frac{h^2}{r^2}}} + Ah^4 + Bh^6 + Ch^8 + Dh^{10}$$

where h represents the height in a direction perpendicular to the optical axis, r the radius of curvature of the vertex, k the conical constant, and A, B, C, D the respective aspherical coefficients of the fourth, sixth, eighth, and tenth orders.

FIG. 1 shows in schematic side elevation a lens arrangement of an image pickup lens system 1 according to a first embodiment of the present invention. As shown in FIG. 1, the image pickup lens system 1 includes, successively in order from an object side, an aperture stop SP, a first lens L1 as a double-convex positive lens having both surfaces which are aspherical, and a second lens L2 as a negative meniscus lens having both surfaces which are aspherical with a convex surface on an image side. In FIG. 1, IP represents an image plane, and G a low-pass filter doubling as a cover glass panel disposed closely to the object side of the image plane IP.

Table 1 given below shows lens data of the numerical example 1 based on specific numerical values applied to the first embodiment, together with the focal length "f" of the overall system, the half angle of view "ω", and the F number "Fno". In Table 1 and other tables of lens data given below, "surface number" represents the ith surface from the object side, "R" the paraxial radius of curvature, "D" the axial surface-to-surface distance between the ith surface and the (i+1)th surface, "Nd" the refractive index with respect to d-line (λ=587.6 nm) of the glass material with the ith surface on the object side, and "νd" the Abbe number with respect to d-line of the glass material with the ith surface on the object side. "∞" given as the paraxial radius of curvature indicates that the corresponding surface is a flat surface.

TABLE 1 f = 1.63 ω = 39.5° Fno = 3.2

| Surface number | R | D | Nd | νd |
|---|---|---|---|---|
| 1 | ∞ | 0.08 | | |
| 2 | 4.6122 | 0.60 | 1.53 | 55.7 |
| 3 | −0.5233 | 0.38 | | |
| 4 | −0.2688 | 0.30 | 1.61 | 26.3 |
| 5 | −0.4582 | 0.70 | | |
| 6 | ∞ | 0.21 | 1.52 | 64.1 |
| 7 | ∞ | 0.10 | | |
| 8 | ∞ | 0.00 | 1.52 | 64.1 |

Both surfaces (second and third surfaces) of the first lens and both surfaces (fourth and fifth surfaces) of the second lens L2 are aspherical. The aspherical coefficients A, B, C, D of the fourth, sixth, eighth, and tenth orders and the conical constants k of the surfaces according to the numerical example 1 are shown in Table 2 given below. In Table 2 and other tables of aspherical coefficients given below, "E-i" represents an exponential expression with a base of 10, i.e., "$10^{-i}$". For example, "0.12345E-05" represents "$0.12345 \times 10^{-5}$".

TABLE 2

| Surface number | k | A | B | C | D |
|---|---|---|---|---|---|
| 2 | −10.12644 | −1.2725E+00 | −6.0458E+00 | −5.6798E+00 | −9.0944E+02 |
| 3 | 0.09111 | 3.2697E−03 | −1.0750E+00 | 9.8043E−01 | 2.7510E+01 |
| 4 | −0.78552 | −1.2450E+00 | 1.4365E+01 | 4.6084E+01 | −1.3656E+02 |
| 5 | −0.99276 | −4.5690E−01 | 1.9558E+00 | 9.1589E+00 | −1.5864E+01 |

Figure 2:
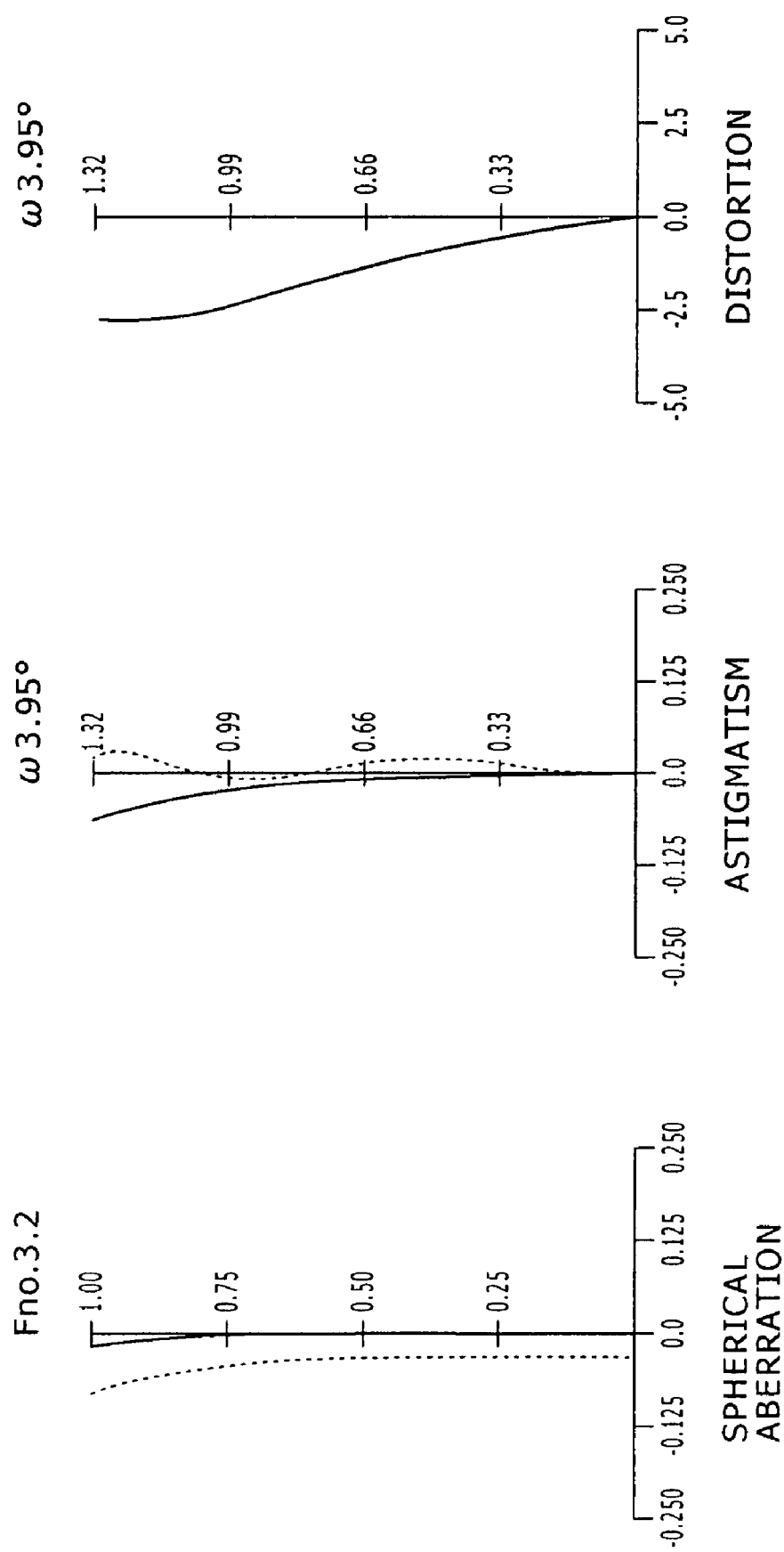
FIG. 2 is a set of diagrams showing the spherical aberrations, astigmatisms, and distortions of a numerical example 1 based on specific numerical values applied to the first embodiment.

FIG. 2 shows various aberrations of the numerical example 1. In the spherical aberration diagram, the solid-line curve represents the spherical aberration with respect to d-line and the broken-line curve the spherical aberration with respect to g-line (435.84 nm). In the astigmatism diagram, the solid-line curve represents the sagittal image surface, and the broken-line curve the meridional image surface.

Figure 3:
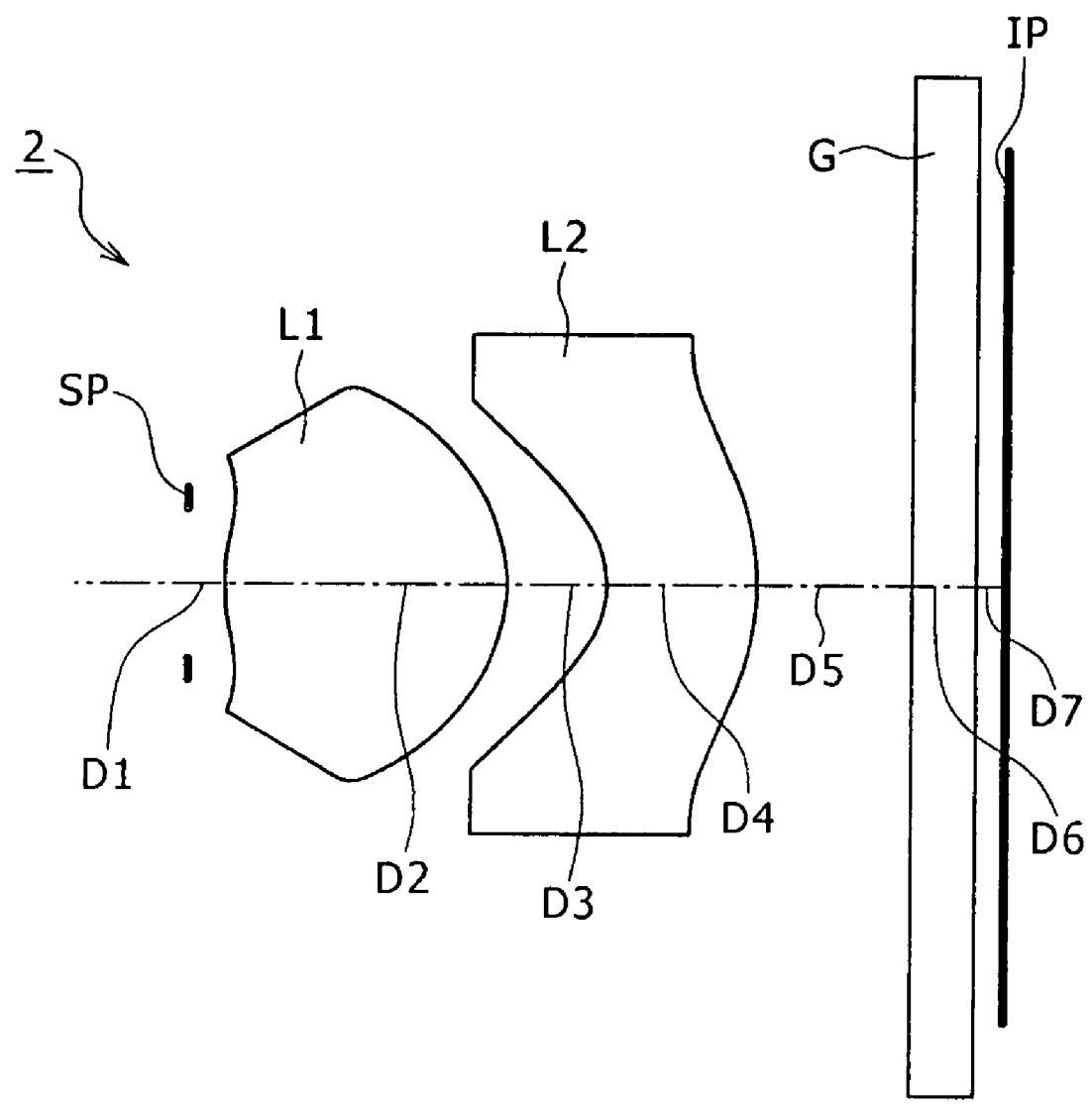
FIG. 3 is a schematic side elevational view showing a lens arrangement of an image pickup lens system according to a second embodiment of the present invention.

FIG. 3 shows in schematic side elevation a lens arrangement of an image pickup lens system 2 according to a second embodiment of the present invention. As shown in FIG. 3, the image pickup lens system 2 includes, successively in order from an object side, an aperture stop SP, a first lens L1 as a double-convex positive lens having both aspherical surfaces, and a second lens L2 as a negative meniscus lens having both aspherical surfaces with a convex surface on an image side. In FIG. 2, IP represents an image plane, and G a low-pass filter doubling as a cover glass panel disposed closely to the object side of the image plane IP.

Table 3 given below shows lens data of the numerical example 2 based on specific numerical values applied to the second embodiment, together with the focal length "f" of the overall system, the half angle of view "ω", and the F number "Fno".

TABLE 3 f = 1.91 ω = 34.5° Fno = 3.2

| Surface number | R | D | Nd | νd |
|---|---|---|---|---|
| 1 | ∞ | 0.13 | | |
| 2 | 2.2594 | 0.98 | 1.53 | 55.7 |
| 3 | −0.5232 | 0.34 | | |
| 4 | −0.3053 | 0.53 | 1.59 | 29.9 |
| 5 | −0.7156 | 0.56 | | |
| 6 | ∞ | 0.21 | 1.52 | 64.1 |
| 7 | ∞ | 0.10 | | |
| 8 | ∞ | 0.00 | 1.52 | 64.1 |

Both surfaces (second and third surfaces) of the first lens and both surfaces (fourth and fifth surfaces) of the second lens L2 are aspherical. The aspherical coefficients A, B, C and D of the fourth, sixth, eighth, and tenth orders and the conical constants k of the surfaces according to the numerical example 1 are shown in Table 4 given below.

TABLE 4

| Surface number | k | A | B | C | D |
|---|---|---|---|---|---|
| 2 | −19.997305 | −2.9352E−01 | 6.4064E−02 | −1.7730E+01 | 1.0827E+01 |
| 3 | −2.967407 | −1.2639E+00 | 1.4651E+00 | −1.9914E+00 | −1.0016E+00 |
| 4 | −1.598736 | −4.4386E−01 | 1.5067E+00 | −4.8600E+00 | 7.4830E+00 |
| 5 | −1.260639 | 4.3073E−01 | 1.8975E−01 | −4.9530E−01 | 3.3053E−01 |

Figure 4:
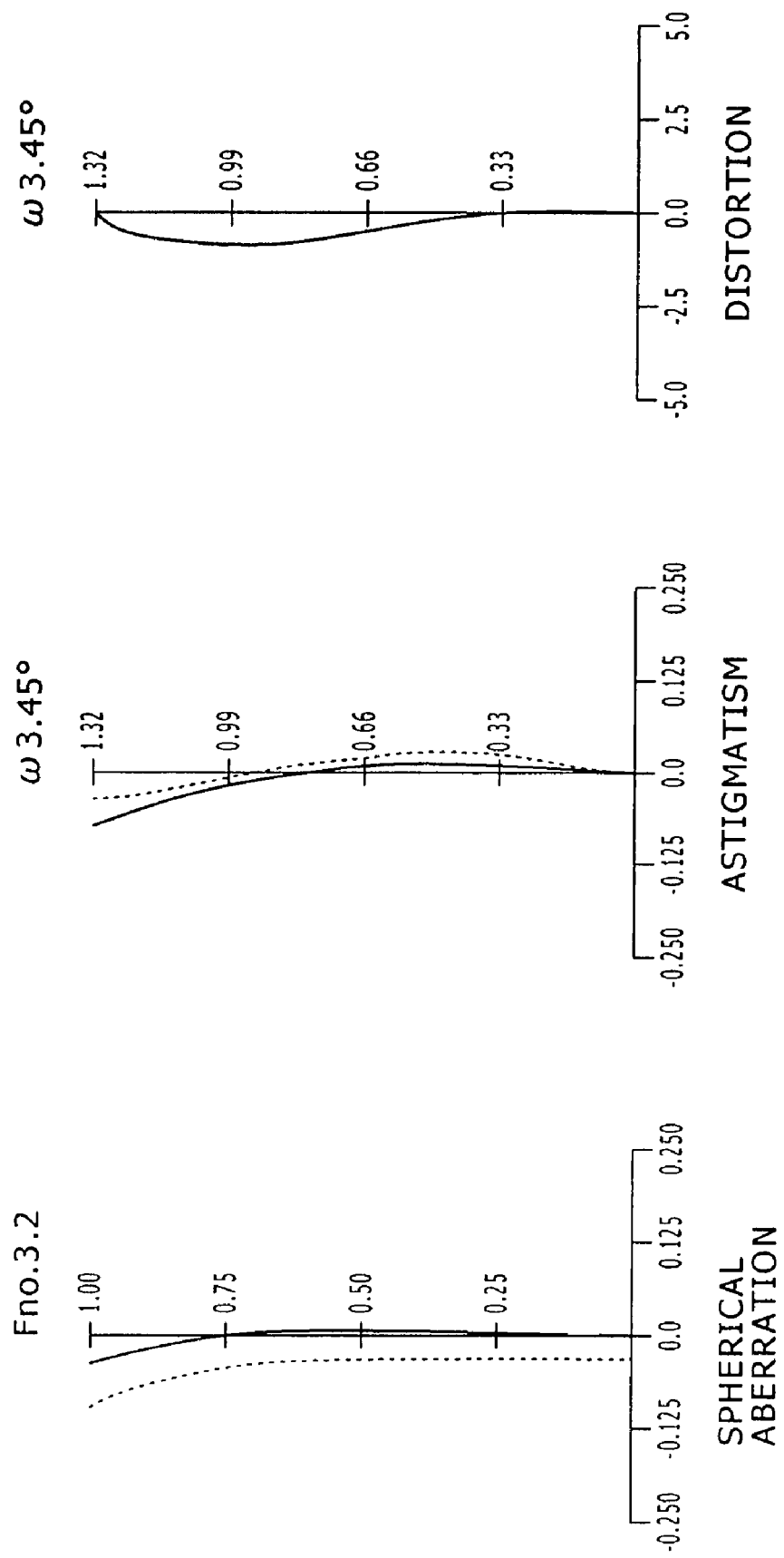
FIG. 4 is a set of diagrams showing the spherical aberrations, astigmatisms, and distortions of a numerical example 2 based on specific numerical values applied to the second embodiment.

FIG. 4 shows various aberrations of the numerical example 2. In the spherical aberration diagram, the solid-line curve represents the spherical aberration with respect to d-line and the broken-line curve the spherical aberration with respect to g-line. In the astigmatism diagram, the solid-line curve represents the sagittal image surface, and the broken-line curve the meridional image surface.

Both the numerical examples 1, 2 satisfy the conditional formulas (1) through (3), have angles of view equal to or greater than 65 degrees, and exhibit an excellent focusing capability with the aberrations well corrected up to the peripheral image region.

An image pickup apparatus according to the present invention will be described below.

The image pickup apparatus according to the present invention includes an image pickup lens system and an imager for converting an optical image formed by the image pickup lens system into an electric signal. The image pickup lens system includes, successively in order from an object side, an aperture stop, a first lens as a double-convex positive lens, and a second lens as a negative meniscus lens having a convex surface on an image side, each of the first and second lenses having at least one aspherical surface, the image pickup lens system satisfying the conditional formula (1): $0.24<|f1/f2|<0.68$, the conditional formula (2): $0.83<R1/f<3.68$, and the conditional formula (3): $0.13<D3/f<0.31$.

Figure 5:
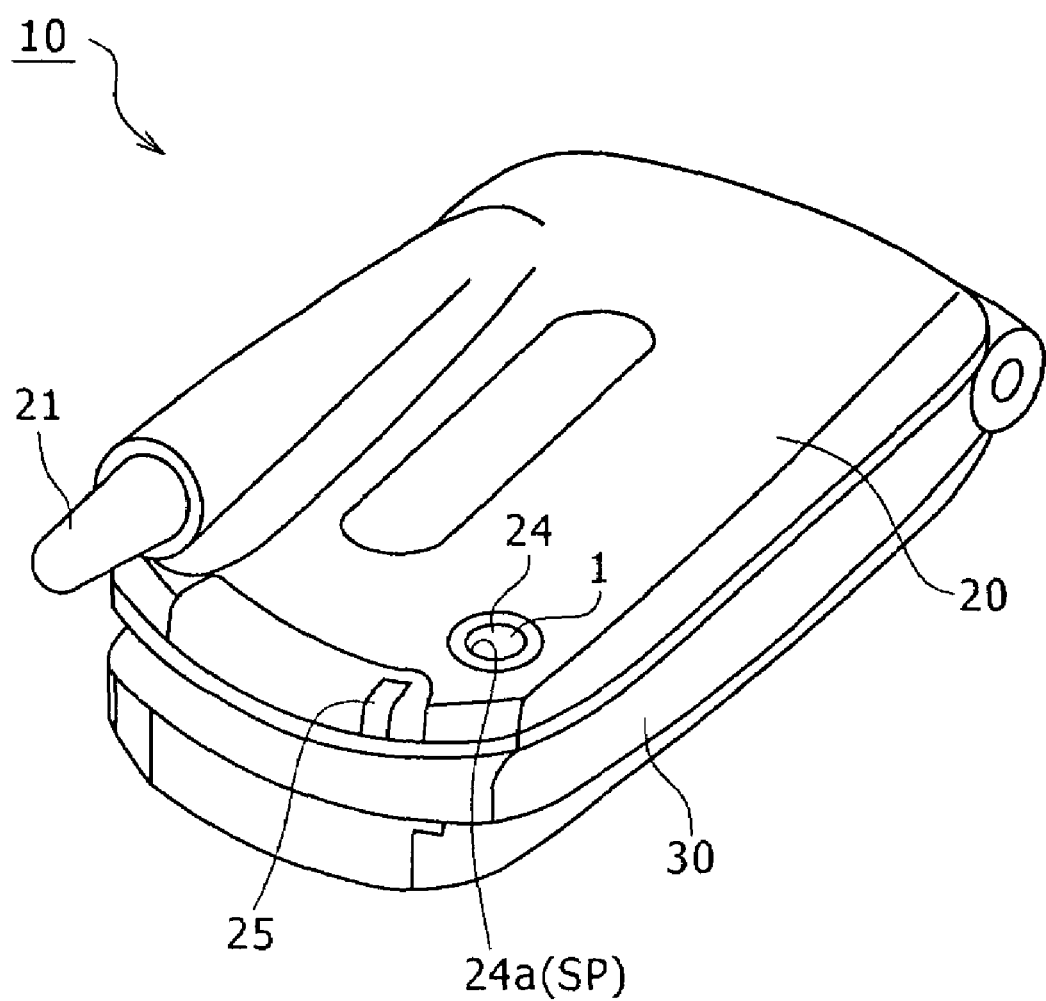
FIG. 5 is a perspective view of an image pickup apparatus according to the present invention, which is applied to a camera on a cellular phone, the view showing the cellular phone when it is not in use or when it is in a call awaiting mode.
Figure 6:
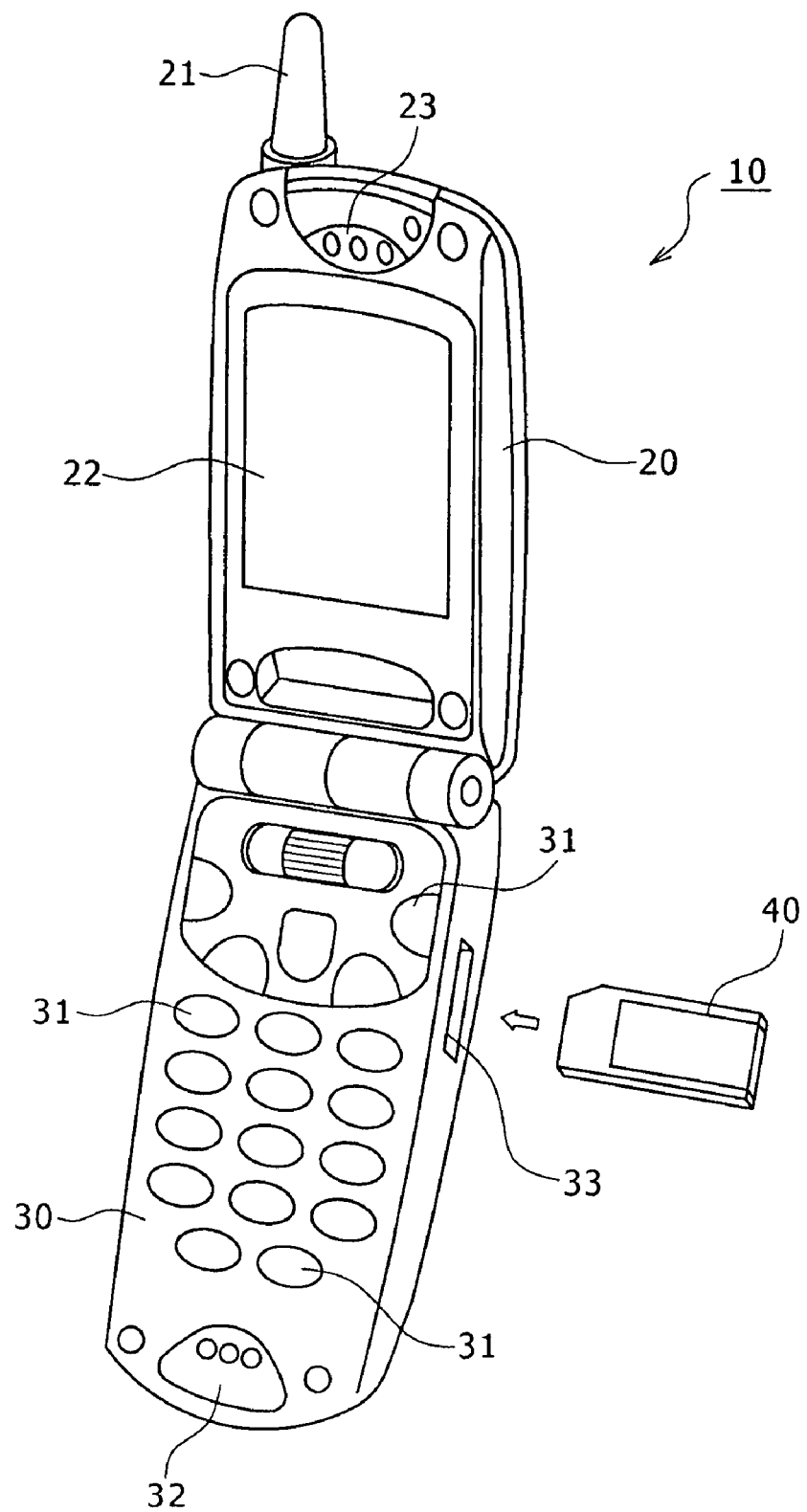
FIG. 6 is a perspective view showing the cellular phone when it is in use.
Figure 7:
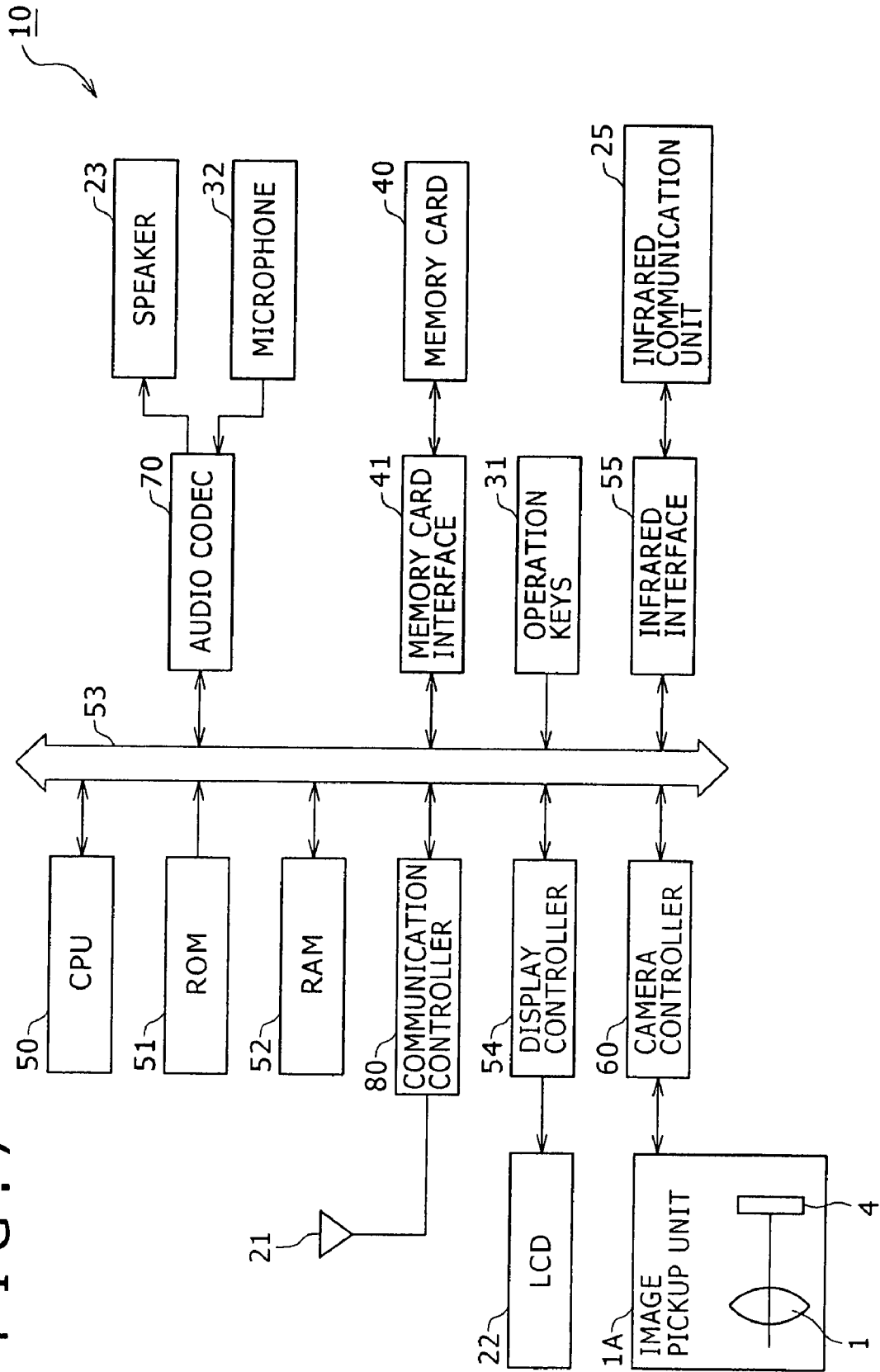
FIG. 7 is a block diagram of an internal arrangement of the cellular phone.

FIGS. 5 through 7 show the image pickup apparatus according to the present invention applied to a camera on a cellular phone.

FIGS. 5 and 6 show the appearance of a cellular phone 10.

The cellular phone 10 includes a display part 20 and a main part 30 which are foldably interconnected by a central hinge. When the cellular phone 10 is carried around, it is folded as shown in FIG. 5. When the cellular phone 10 is in use for making or receiving a phone call, it is unfolded, i.e., the display part 20 and the main part 30 are spread away from each other, as shown in FIG. 6.

The cellular phone 10 also includes a retractable antenna 21 mounted on one side of the back of the display part 20 for transmitting a radio wave to and receiving a radio wave from a base station. The display part 20 includes a liquid crystal display panel 22 disposed on an inner side thereof and having such a size as to take up almost all the area of the inner side, and a speaker 23 positioned above the liquid crystal display panel 22. The display part 20 also includes an image pickup unit 1A (see FIG. 7) of a digital camera. The image pickup unit 1A includes the image pickup lens system 1 (or the image pickup lens system 2) exposed to the exterior through an exposure hole 24 that is defined in the back of the display part 20. The term "image pickup unit" is used here to mean a unit including an image pickup lens 1 and an imager 4. The concept "image pickup unit" is employed because the image pickup lens 1 and the imager 4 need to be housed in the display part 20, but other components of the digital camera, e.g., a camera controller, a recording medium, etc., may be housed in the main part 30. The imager 4 may include a photoelectric transducer such as a CCD, a CMOS, or the like. The exposure hole 24 has a peripheral edge 24a serving as the aperture stop SP of the image pickup lens system 1 (or the image pickup lens system 2).

An infrared communication unit 25 is disposed on the distal end of the display part 20. The infrared communication unit 25 includes an infrared radiation emitter and an infrared radiation detector, both not shown.

The main part 30 has on its inner side a plurality of operation keys 31 including numerical keys ranging from "0" to "9", a call key, a power supply key, etc., and a microphone 32 disposed beneath the operation keys 31. The main part 30 also has a memory card slot 33 defined in a side face thereof. A memory card 40 can be inserted into and removed from the main part 30 through the memory card slot 33.

FIG. 7 shows in block form internal arrangement of the cellular phone 10.

As shown in FIG. 7, the cellular phone 10 includes a CPU (Central Processing Unit) 50 for controlling the entire operation of the cellular phone 10. Specifically, the CPU 50 loads a control program stored in a ROM (Read Only Memory) 51 into a RAM (Random Access Memory) 52, and controls the operation of the cellular phone 10 through a bus 53 based on the control program.

The cellular phone 10 also includes a camera controller 60 for controlling the image pickup unit 1A, which includes the image pickup lens system 1 and the imager 4, to captures images including still and moving images. The camera controller 60 compresses obtained image information according to JPEG, MPEG, or the like, and sends the compressed image information through the bus 53 to the RAM 52 where the image information is temporarily stored. If necessary, the image information is output to a memory card interface 41 which saves the image information in the memory card 40, or transmitted to a display controller 54 which displays a corresponding image on the liquid crystal display panel 22. Audio information which is recorded through the microphone 32 at the same time that the image information is recorded is also temporarily stored through an audio codec 70, together with the image information, in the RAM 52. If necessary, the audio information is stored in the memory card 40. At the same time that the image information is displayed on the liquid crystal display panel 22, the audio information is supplied through the audio codec 70 to the speaker 23 which outputs a corresponding sound. If necessary, the image information and the audio information are output through an infrared interface 55 to the infrared communication unit 25 which transmits the image information and the audio information to an external device having a similar infrared communication unit, e.g., a cellular phone, a personal computer, a PDA (Personal Digital Assistant), or the like. For displaying a moving image or a still image on the liquid crystal display panel 22 based on the image information stored in the RAM 52 or the memory card 40, the camera controller 60 decodes or decompresses a file of the image information stored in the RAM 52 or the memory card 40, and then sends the decoded or decompressed image data through the bus 53 to the display controller 54.

A communication controller 80 transmits a radio wave to and receives a radio wave from the base station through the antenna 21. In a voice communication mode, the communication controller 80 processes received audio information, and then outputs the processed audio information through the audio codec 70 to the speaker 23 which outputs a corresponding sound. The communication controller 80 also receives audio data picked up by the microphone 32 through the audio codec 70, processes the received audio data, and then transmits the audio data.

Since the image pickup lens system 1 (or the image pickup lens system 2) can be reduced in depth, the image pickup lens system 1 can easily be incorporated in a device having a limited thickness, such as the cellular phone 10. As the image pickup lens system 1 has a wide angle of view, it can capture much information through a single screen, and is highly suitable for use as an image pickup lens system on a cellular phone as a portable information device.

The specific structural details, shapes, and numerical values illustrated in the above embodiments and the numerical examples are given by way of illustrative example only, and should not be interpreted as restricting the technical scope of the present invention.

Although certain preferred embodiments of the present invention have been shown and described in detail, it should be understood that various changes and modifications may be made therein without departing from the scope of the appended claims.

What is claimed is:

1. An image pickup lens system comprising, successively in order from an object side:

an aperture stop;

a first lens as a double-convex positive lens; and a second lens as a negative meniscus lens having a convex surface on an image side;

each of the first and second lenses having at least one aspherical surface, said image pickup lens system satisfying the following conditional formulas (1), (2), and (3):

$$0.24 < |f1/f2| < 0.68 \quad (1)$$

$$0.83 < R1/f < 3.68 \quad (2)$$

$$0.13 < D3/f < 0.31 \quad (3)$$

wherein f1 is a focal length of the first lens;

f2 is a focal length of the second lens;

R1 is a paraxial radius of curvature of the surface on the object side of the first lens;

f is a focal length of the entire system; and

D3 is an axial surface-to-surface distance between the first lens and the second lens.

2. An image pickup apparatus comprising:

an image pickup lens system; and an imager for converting an optical image formed by said image pickup lens system into an electric signal;

said image pickup lens system including, successively in order from an object side, an aperture stop, a first lens as a double-convex positive lens, and a second lens as a negative meniscus lens having a convex surface on an image side, each of the first and second lenses having at least one aspherical surface, said image pickup lens system satisfying the conditional formula (1): $0.24 < |f1/f2| < 0.68$, the conditional formula (2): $0.83 < R1/f < 3.68$, and the conditional formula (3): $0.13 < D3/f < 0.31$ where f1 is a focal length of the first lens, f2 is a focal length of the second lens, R1 is a paraxial radius of curvature of the surface on the object side of the first lens, f is a focal length of the entire system, and D3 is an axial surface-to-surface distance between the first lens and the second lens.

* * * * *